(12) United States Patent
Collier et al.

(10) Patent No.: US 7,772,147 B2
(45) Date of Patent: Aug. 10, 2010

(54) CATALYST CARRIER SUBSTRATE COATED WITH WASHCOAT COMPRISING FIBROUS MATERIAL

(75) Inventors: Paul John Collier, Reading (GB); Alison Mary Wagland, Watlington (GB)

(73) Assignee: Johnson Matthey Public Limited Company, London (GB)

( * ) Notice: Subject to any disclaimer, the term of this patent is extended or adjusted under 35 U.S.C. 154(b) by 170 days.

(21) Appl. No.: 11/662,721

(22) PCT Filed: Sep. 12, 2005

(86) PCT No.: PCT/GB2005/003516

§ 371 (c)(1),
(2), (4) Date: Mar. 13, 2007

(87) PCT Pub. No.: WO2006/030189

PCT Pub. Date: Mar. 23, 2006

(65) Prior Publication Data

US 2007/0259779 A1     Nov. 8, 2007

(30) Foreign Application Priority Data

Sep. 13, 2004   (GB) .................................. 0420245.3

(51) Int. Cl.
*B01J 21/00* (2006.01)
*B01J 23/00* (2006.01)
*B01J 20/00* (2006.01)

(52) U.S. Cl. ...................... 502/240; 502/232; 502/244; 502/245; 502/247; 502/248; 502/251; 502/252; 502/255; 502/258; 502/259; 502/260; 502/261; 502/262; 502/300; 502/304; 502/306; 502/308; 502/309; 502/312; 502/313; 502/314; 502/315; 502/316; 502/318; 502/322; 502/323; 502/327; 502/328; 502/331; 502/332; 502/333; 502/334; 502/335; 502/336; 502/337; 502/338; 502/339; 502/340; 502/341; 502/346; 502/347; 502/348; 502/349; 502/350; 502/351; 502/354; 502/355; 502/415; 502/439; 502/527.14; 502/527.24

(58) Field of Classification Search ................. 502/240, 502/244, 245, 246, 247, 248, 251, 252, 255, 502/258–262, 300, 304, 305, 306, 308, 309, 502/311, 312–316, 317, 318, 321, 322, 323, 502/326, 327, 328, 331–341, 346, 349–351, 502/353, 354, 355, 415, 439, 527.14, 527.24
See application file for complete search history.

(56) References Cited

U.S. PATENT DOCUMENTS 4,177,168 A  *  12/1979   Denny et al. ................. 502/313

(Continued)

FOREIGN PATENT DOCUMENTS

EP         0 379 746 A2         8/1990

(Continued)

OTHER PUBLICATIONS

Yang, J. et al., "Mechanical spectroscopy of Mg reinforced with $Al_2O_3$ short fibers and C nanotubes," *Materials Science and Engineering A*, 370 (2004), pp. 512-515.

(Continued)

*Primary Examiner*—Cam N Nguyen
(74) *Attorney, Agent, or Firm*—RatnerPrestia

(57) ABSTRACT

A solid catalyst carrier substrate coated with a surface area-enhancing washcoat composition including a catalytic component, a metal oxide and a refractory fibrous or whisker-like material having an aspect ratio of length to thickness in excess of 5:1.

19 Claims, 1 Drawing Sheet

U.S. PATENT DOCUMENTS

| | | | |
|---|---|---|---|
| 4,279,782 A * | 7/1981 | Chapman et al. | 502/314 |
| 4,362,651 A * | 12/1982 | Schwarzenbek | 502/217 |
| 4,370,262 A | 1/1983 | Takahashi et al. | |
| RE31,719 E * | 10/1984 | Sonetaka et al. | 502/63 |
| 4,514,520 A * | 4/1985 | Uytterhoeven et al. | 502/337 |
| 4,564,607 A * | 1/1986 | Yoneda et al. | 502/209 |
| 4,608,361 A * | 8/1986 | Kanamori et al. | 502/232 |
| 4,749,671 A | 6/1988 | Saito et al. | |
| 4,784,984 A * | 11/1988 | Yamanaka et al. | 502/439 |
| 5,187,021 A | 2/1993 | Vydra et al. | |
| 5,326,735 A | 7/1994 | Itoh et al. | |
| 5,447,698 A * | 9/1995 | Jha et al. | 422/180 |
| 5,650,370 A * | 7/1997 | Tennent et al. | 502/174 |
| 5,849,416 A | 12/1998 | Coffinberry et al. | |
| 6,177,381 B1 | 1/2001 | Jensen et al. | |
| 6,280,608 B1 | 8/2001 | Jensen et al. | |
| 6,376,730 B1 | 4/2002 | Jan et al. | |
| 6,486,370 B1 | 11/2002 | Rende et al. | |
| 6,596,665 B2 * | 7/2003 | Wallin et al. | 502/238 |
| 6,632,529 B1 | 10/2003 | Clough | |
| 6,632,530 B1 | 10/2003 | Clough | |
| 6,641,908 B1 | 11/2003 | Clough | |
| 6,710,003 B2 | 3/2004 | Jan et al. | |
| 6,756,515 B2 | 6/2004 | Rende et al. | |
| 6,784,134 B2 * | 8/2004 | Kasuga et al. | 502/182 |
| 6,811,881 B1 * | 11/2004 | Clough | 428/403 |
| 6,821,621 B1 * | 11/2004 | Clough | 428/403 |
| 6,858,769 B2 | 2/2005 | Woodle et al. | |
| 6,866,885 B1 | 3/2005 | Clough | |
| 6,878,847 B2 * | 4/2005 | Kasuga et al. | 562/532 |
| 6,887,816 B2 * | 5/2005 | Tanaka et al. | 502/100 |
| 7,008,695 B1 * | 3/2006 | Clough | 428/367 |
| 2003/0157344 A1 | 8/2003 | Shoup et al. | |
| 2006/0159916 A1 * | 7/2006 | Dubrow et al. | 428/357 |
| 2006/0172179 A1 * | 8/2006 | Gu et al. | 429/44 |

FOREIGN PATENT DOCUMENTS

| | | |
|---|---|---|
| EP | 0 398/ 766 A1 | 11/1990 |
| EP | 0 424 833 A2 | 5/1991 |
| EP | 1 437 491 A1 | 7/2004 |
| GB | 1012473 | 12/1965 |
| GB | 1 466 465 | 3/1977 |
| GB | 2 138 694 A | 10/1984 |
| JP | 53-15285 | 2/1978 |
| JP | 56-44045 | 4/1981 |
| JP | 10-202113 | 8/1998 |
| JP | 11-267523 | 10/1999 |
| JP | 2001-252574 A | 9/2001 |
| WO | WO-02/056404 A1 | 7/2002 |
| WO | WO-2007/008288 A2 | 1/2007 |

OTHER PUBLICATIONS

Casas, L. et al., "Microstructural characterisation of an alumina/mullite composite tested in creep," *Materials Science and Engineering A*, 368 (2004), pp. 139-144.

Demir, A. et al., "Mechanical property improvements in Nicalon SiC fibre reinforced silicon nitride ceramics by oxide coating of $Si_3N_4$ starting powders," Article in Press, accepted on May 7, 2004 for publication in *Composites Part A*.

Kavas, T. et al., "Structural properties of sepiolite-reinforced cement composite," Article in Press, accepted on Mar. 18, 2004 for publication in *Cement and Concrete Research*.

Samuel, M., Reinforcement of recycled aluminum-alloy scrap with Saffil ceramic fibers, *Journal of Materials Processing Technology* 142 (2003), pp. 295-306.

Ahn, H. S., "Fabrication of silicon carbide whiskers and whisker-containing composite coatings without using a metallic catalyst," *Surface Coatings Technology*, 154 (2002), pp. 276-281.

Carter, R. H., "Characterizing the Mechanical Properties of Composite Materials Using Tubular Samples," Dissertation Submitted to the Faculty of the Virginia Polytechnic Institute and State University In Partial Fulfillment of the Requirements for the Degree of Doctorate of Philosophy In Materials Engineering Science, Jul. 16, 2001, Blacksburg, Virginia, © 2001, Robert Hansbrough Carter.

Marshall, D. B. et al., "Ceramics for future power generation technology: fiber reinforced oxide composites," *Current Opinion in Solid State and Materials Science*, 5 (2001), pp. 283-289.

Zwinkels, Marcus F. M., "Preparation of combustion catalysts by washcoating alumina whiskers-covered metal monoliths using a sol-gel method," *Preparation of Catalysts VI: Scientific Bases for the Preparation of Heterogeneous Catalysts*, G. Poncelet et al. (Editors), © 1995 Elsevier Science B.V.

Product Information for Kaowool Paper manufactured by Thermal Ceramics, Jan. 2003.

Cayron, C., "TEM study of interfacial reactions and precipitation mechanisms in $Al_2O_3$ short fiber or high volume fraction SiC particle reinforced Al-4Cu-1Mg-0.5Ag squeeze-cast composites," Chapter 2, Ph.D. Thesis presented at the Department of Materials at the Federal Polytechnic School of Lausanne, Thesis No. 2246 (2000).

* cited by examiner

CATALYST CARRIER SUBSTRATE COATED WITH WASHCOAT COMPRISING FIBROUS MATERIAL

CROSS-REFERENCE TO RELATED APPLICATIONS

This application is the U.S. National Phase application of PCT International Application No. PCT/GB2005/003516, filed Sep. 12, 2005, and claims priority of British Patent Application No. 0420245.3, filed Sep. 13, 2004.

FIELD OF THE INVENTION

The present invention relates to a catalyst carrier substrate coated with a surface area-enhancing washcoat composition, and in particular to such washcoat compositions with improved mechanical strength for industrial applications, including for use in vehicular exhaust systems.

BACKGROUND OF THE INVENTION

The technique of applying an oxide washcoat onto a ceramic flow-through honeycomb monolith in order to increase its surface area, and catalysing the product, has been very well established for some 30 years. Tens of millions of automobile catalytic convertors using this technology are made each year. Conventionally, a slurry of washcoat is deposited on the substrate, and the coated substrate is dried to form a green coated substrate which is then fired. The fired washcoated monolith is then impregnated with one or more catalytic metals from the platinum group. However, problems are beginning to emerge when trying to use this technology in more demanding situations such as with metallic substrates instead of ceramic substrates for vehicle catalytic converters, and in process catalyst systems (that is, large scale catalysed processes including sulphuric acid and nitric acid processes, steam reforming, purification processes etc). Coating durability is becoming a significant issue, especially in processes which involve the catalytic treatment of fluid systems where there are abrasive contaminants in the fluid or the catalytic device or reactor is subject to thermal and/or mechanical shocks.

It is known to use fibre reinforcement to strengthen a weaker matrix, for example in glass-fibre or carbon fibre reinforcement of plastics, and silicon carbide or nitride fibre reinforcements for metals or ceramics. Also, of course, there is reference in the Bible to making sun-dried clay bricks with straw. Most levels of fibre additions in such composites have been in the 30 to 90 wt % range. In these materials, toughness is brought about due to the strain tolerance achieved as the reinforcing fibres bridge advancing cracks in the matrix, because the failure strain of the fibres is significantly greater than the matrix. There are many ways to reinforce a matrix including, but not restricted to fibres of quartz or alumina or whiskers of SiC. There has not been, however, any suggestion of using fibres or whiskers in micron scale washcoat coatings on solid catalyst carrier substrates, and it appeared unlikely that small quantities of fibres, which may be of the same composition as at least part of the matrix washcoat material, would provide any beneficial effect. From the catalyst chemist's point of view also, there seems to be no advantage in mixing an essentially inert material into a catalyst composition.

Ahn et al ("Fabrication of silicon carbide whiskers and whisker containing composite coatings without using a metallic catalyst", Surface and Coatings Technology, 2002, 154(2-3), 276-281) describe how composite coatings were prepared by alternative whisker growth conditions and the matrix filling process.

Zwinkels et al ("Preparation of combustion catalysts by washcoating alumina whisker-covered metal monoliths using the sol-gel method", Studies in Surface Science and Catalysis, 1995, 91, 85-94) describe how metallic monoliths covered with alumina whiskers were dip coated in a silica containing slurry. Pd was impregnated onto the thus prepared coating to yield a suitable catalyst for catalytic combustion.

U.S. Pat. No. 5,326,735 (NE Chemcat Corp.) describes the preparation of catalyst by the deposition of iridium on a metal carbide or nitride support of which the source is unimportant but it is suggested in the patent that an inexpensive source, such as whiskers or powders with diameter 0.1 to 100 microns be used. The Ir/whisker catalyst is typically ball milled for 16 hours with binders to produce a suitable washcoat for monolith coating. No mention of enhanced coating durability is made either in the claims or the examples and it is unlikely that the whiskers survive the extensive milling process.

JP 2001252574 (Babcock-Hitachi K. K.) describes the manufacture of a catalysed fibre reinforced substrate for flue aftertreatment applications. The substrate is a multilayered structure manufactured from metal lath board spray coated with a binder such as silica sol or PVA and glass fibre nonwoven cloth, which is then subsequently coated with a catalyst. In this case the fibre layer forms part of the substrate and is in effect providing a beneficial keying surface for the catalyst coating subsequently deposited.

JP 11267523 (Babcock-Hitachi K. K.) described how inorganic fibre cloth, such as silica-alumina glass fibre, can be strengthened with PVA followed by coating with a catalyst paste such as titania to furnish a catalyst coated substrate for flue glass treatment. In a further patent (JP 10202113, Babcock-Hitachi) this process is modified by sandwiching a catalyst paste between two inorganic fabric substrates and applying pressure to form strengthened catalysed articles. Both of these are examples of fibres used to manufacture composite materials which happen to be catalysed. A further example is given by JP 53015285 (Mitsubishi Heavy Industries) in which metal wire reinforced support shapes are prepared and then impregnated with catalyst precursors.

GB2138694A (Nippon Shokubai) discloses a catalyst composition which comprises a heteropolyacid-type catalytically active ingredient based on molybdophosphoric or molybdovanadophosphoric acid as a base and whiskers (whiskers typically included in an amount of 1-50% by weight based on the catalyst ingredients). The catalyst composition is reported to have excellent mechanical strengths (eg. compressive strength, abrasion resistance and falling strength) in industrial use. In one embodiment, a supported catalyst is prepared by spraying a slurry of a mixture of a compound containing a heteropolyacid as a base and whiskers onto a suitable carrier. Ordinary spherical carrier material having a diameter of 3-5 mm is exemplified. The carrier can also take the form of a solid cylinder, a hollow cylinder, broken fragments, a triangular pyramid etc, preferably at 1-10 mm, or a honeycomb or pipe.

SUMMARY OF THE INVENTION

We have now developed a washcoat composition for coating on a solid substrate, such as a honeycomb monolith substrate, which composition has improved mechanical strength for industrial applications, including for use in vehicular exhaust systems.

According to a first aspect, the invention provides a solid catalyst carrier substrate coated with a surface area-enhancing washcoat composition, which composition comprising a catalytic component, a metal oxide and a refractory fibrous or whisker-like material having an aspect ratio of length to thickness in excess of 5:1. In one embodiment, the aspect ratio of length to thickness of the refractory fibrous or whisker-like material is in excess of 50:1. In another embodiment the washcoat is porous to gas transport.

BRIEF DESCRIPTION OF THE INVENTION

Figure 1:
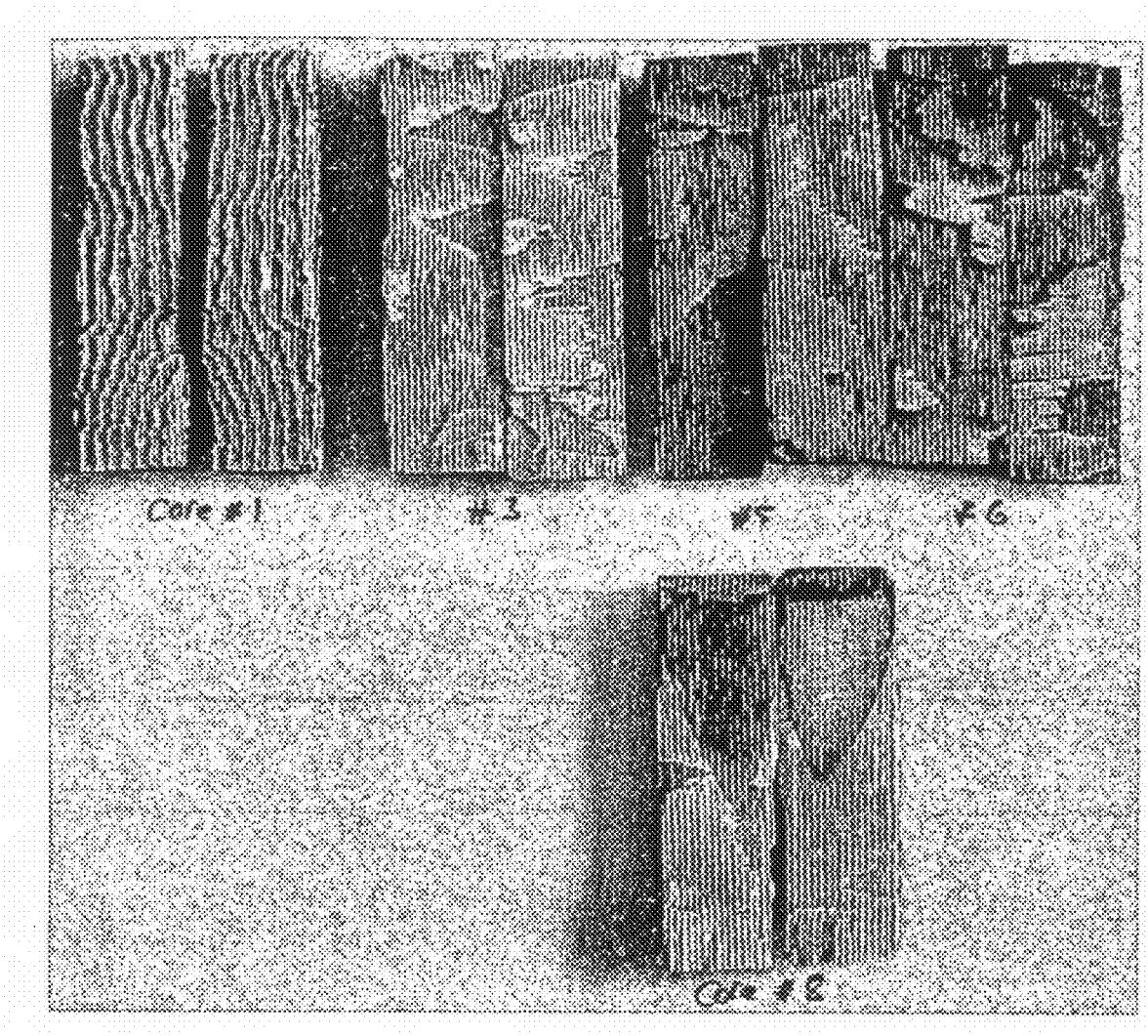
FIG. 1 is a photograph showing axial sections through honeycomb monoliths to demonstrate coating penetration by various washcoat compositions according to the invention compared with the teaching of GB2138694A.

The catalyst compositions of GB2138694A do not contain both a metal oxide and a catalytic metal component. Furthermore, we have investigated the possibility of using catalytic metal components other than heteropolyacid in the supported catalyst compositions of GB2138694A. What we found was that, not only did the supported catalyst compositions have very poor mechanical strength, but they are also very poor catalysts. Accordingly, we conclude that GB2138694A does not enable the skilled person to practice the technical teaching which is the subject of the document for any other catalytic metal components than heteropolyacids.

Whilst the scope of the accompanying claims extends to the combination of heteropolyacid as a catalytic component, a metal oxide and refractory fibrous or whisker-like materials, in one embodiment the catalytic component is any catalytic component except heteropolyacids.

The catalytic component can consist of a zeolite, a clay or a vanadium phosphorus oxide, but in an embodiment the catalytic component comprises at least one metal, optionally supported on a surface area enhancing support.

In embodiments comprising at least one metal, the metal can be any precious metal, magnesium, nickel, cobalt, iron, vanadium, copper, molybdenum, aluminium, silicon or mixtures of any two or more thereof. The metal can be present as elemental metal or as a compound thereof eg. an oxide. The metal can be carried on a surface area-enhancing support including zeolites, alumina, titania, silica, zirconia or ceria or mixed oxides or composite oxides of any two or more thereof eg. silica-alumina, ceria-zirconia or alumina-ceria-zirconia. Illustrative examples of catalytic metal components include Pd/$Al_2O_3$, Fe/mordenite or Beta-zeolite and Mg/ZSM5.

At its most basic level of design, the metal in the washcoat composition represents the catalytic component and the support on which the metal is carried is the metal oxide. Therefore a washcoat composition for use in the invention can comprise a metal supported on a metal oxide and a refractory fibrous or whisker-like material.

Methods of making supported catalytic metal components are known to the skilled person and include the incipient wetness technique and co-precipitation. Accordingly, more detailed explanation of such methods will not be made here.

The metal in the catalytic metal component can be present at up to 30 wt % based on the total weight of the washcoat composition. For example, for acetylene hydrogenation 200 ppm Pd/$Al_2O_3$ may be an adequate loading, whereas for Fisher-Tropsch catalysts a loading of 20-30 wt % may be required.

The solid catalyst carrier substrate may be a metallic flow-through honeycomb monolith of various forms, a "static mixer"-type structure, a wire mesh device, a plate or any other reactor component, although it is envisaged that the invention may also find useful application in more challenging applications on ceramic monoliths. The catalyst carrier substrate may provide a partial or complete filtering function, such that particles, including especially diesel or other combustion soot, are delayed within the substrate to allow reaction with gas components or allow a catalysed reaction. Also included are macroporous articles such as Raschig rings or other shaped carriers.

The refractory fibrous material is one that withstands the conventional firing process used to convert the washcoat or washcoat precursor into a suitable oxidic form, and withstands normal conditions of use. The fibrous material can be selected from alumina, preferably gamma-alumina, mullite and other metal oxide ceramic fibres, although some or all of such ceramic fibres may be replaced by a silicon carbide or nitride-type fibre or whiskers, or quartz. The fibrous material is suitably in the form of dispersed single filaments. Such filaments are suitably of 10 nm diameter and up to 5 mm length. Suitable fibrous material is commercially available, for example "Saffil" ("Catalyst Grade" fibrous mat supplied by Saffil plc). The Saffil fibres are typically 3.5 μm diameter. The fibres or whisker-like materials may be optionally chemically modified to enhance their properties.

It is recognised that particles of refractory fibrous materials in the sub-1 μm range can be hazardous to health eg. asbestosis. However, the size of the refractory fibrous material can be selected as appropriate depending on the risk of exposure. For example, in chemical manufacture, personnel are likely to wear protective clothing and respirators and so use of sub-micron diameter fibres could be acceptable, whereas for vehicular uses larger diameter fibres would be used to avoid emitting hazardous particles to atmosphere.

The metal oxide component of the washcoat composition is itself not critical and may be any silica, alumina, titania, ceria-zirconia mixed oxide, or ceria-zirconia-alumina blend including doped versions of the foregoing. It is conventional to include a binder in a washcoat slurry, and it is preferred to include a binder such as a colloidal silica, for example "Ludox", in the present invention. It is envisaged that the invention could also be applied to coatings of purification aids such as copper-zinc-alumina mixed oxides for sulphur removal or stoichiometric reagents such as supported oxides for hydrogen sequestration. Accordingly, the term "washcoat composition" as used herein includes coatings that are themselves chemically active as well as those that are essentially inert. For example, many modern automotive catalyst washcoat compositions play an active part in oxygen management or NOx storage, and washcoat compositions may incorporate "getter"-type materials. In one embodiment, the metal oxide component is present at up to 35 wt % of the washcoat composition.

Typical thicknesses of washcoat compositions are in the range from 5 up to 100 μm; optionally in the 5 to 60 μm thickness range.

The quantity of refractory fibrous or whisker-like material is suitably in the range from 0.5 to 49.9 wt % of the solids content, such as in the less than 30 wt % range eg. in the 1-15 wt % range. The fibrous material may be readily mixed into a slurry of the washcoat using conventional techniques. Initial trials indicate that comminution of fibres tends to increase the quantity required.

The washcoat composition comprises one or more catalytic metal components, optionally with promoters. The catalytic components may be incorporated in solution in a slurry of the fibrous material-containing washcoat composition, and/or one or more of the washcoat composition slurry components, including the fibrous or whisker-like material, may be pre-catalysed. Alternatively, a catalyst solution may be deposited onto the washcoat composition-carrying substrate after firing of the green washcoat composition-coated substrate.

It should be understood that the substrate according to the invention may comprise a multi-layer coating of washcoat compositions, in which the other layer(s) may also be according to the invention or may be conventional.

According to a second aspect, the invention provides a method of forming a substrate according to the invention, comprising applying to a substrate a slurry comprising a washcoat composition comprising a catalytic component, a metal oxide and a refractory fibrous or whisker-like material having an aspect ratio of length to thickness in excess of 5:1, and drying and firing the coated substrate.

A washcoat composition slurry comprising the fibrous or whisker-like material has been successfully deposited onto metallic substrates using a variety of methods, including a K-bar applicator onto metal plates, spray-coating metallic substrates and by using Johnson Matthey's proprietary "Precision Coating" technology according to EP 1064094 to deposit onto a commercial metallic vehicle catalytic convertor substrate. Thus it is believed that no special process steps or modifications need to be made to conventional washcoat composition deposition and firing methods. There are many methods known to those skilled in the art of coating substrates with layers such as precision coating, spray coating, printing, dip coating, manual or automatic techniques, and application by electrostatic techniques.

According to a third aspect, the invention comprises a slurry comprising a washcoat composition for use in the method according to the invention, which washcoat composition comprising a catalytic component, a metal oxide and a refractory fibrous or whisker-like material having an aspect ratio of length to thickness in excess of 5:1.

Tests of various types on the coated substrates according to the invention indicate significantly reduced cracking on drying during the formation of the green coated substrate, and significantly improved durability. Durability may be assessed by tests ranging from bombarding the fired coated substrate with alpha alumina balls, by adhesive tape tests, high velocity air flow and by dropping a complete vehicle catalytic convertor a number of times onto a concrete floor with quantification by weighing before and after to simulate knocks or impacts in use.

The invention will now be described with reference to the following non-limiting examples and with reference to the accompanying drawing wherein:

FIG. 1 is a photograph showing axial sections through honeycomb monoliths to demonstrate coating penetration by various washcoat compositions according to the invention compared with the teaching of GB2138694A.

Comparative Example 1

$\gamma$-$Al_2O_3$ Fibre Strengthened $CeO_2$—$ZrO_2$—$Al_2O_3$ Coatings

Various levels of $\gamma$-$Al_2O_3$ fibre ("Catalyst Grade" fibrous mat supplied by Saffil plc) were added by breaking up the fibre mat and dispersing with a high shear stirrer in a 30% solids slurry of ceria-zirconia-alumina in quantities of 0, 1.4, 3.2, 6.1 and 11.4 wt. % (with respect to the solids level of the slurry). Cleaned stainless steel plates (215 mm×75 mm×1 mm) were coated with the fibre/ceria-zirconia-alumina slurry using a K-bar with forced air drying at ambient temperature followed by drying overnight in a 130° C. isothermal oven. Following drying, the coated plates were heated in air to 500° C. at a rate of 2° C./minute.

Pieces of the coated plate (typically 110×76 mm) were abrasion tested by being placed in a 1.3 liter screw top plastic bottle with 100 g of 13 mm $\alpha$-$Al_2O_3$ balls and shaken vigorously by hand for 1 minute. The plate was weighed before and after the abrasion test to determine the amount of coating lost and also the remaining coating was removed to determined the total amount of coating present at the start (see table 1)

TABLE 1

| System | Coating loading (wt %) | Weight of coating present before test (g) | Weight of coating present after test (g) | Coating remaining (wt %) |
| --- | --- | --- | --- | --- |
| CeO2—ZrO2—Al2O3 only | 0.39 | 0.1907 | 0.1684 | 88.3 |
| 1.4 wt % $\gamma$-$Al_2O_3$ fibre/CeO2—ZrO2—Al2O3 | 0.44 | 0.2191 | 0.1875 | 85.6 |
| 3.2 wt % $\gamma$-$Al_2O_3$ fibre/CeO2—ZrO2—Al2O3 | 0.59 | 0.2899 | 0.2888 | 99.6 |
| 6.1 wt % $\gamma$-$Al_2O_3$ fibre/CeO2—ZrO2—Al2O3 | 0.63 | 0.3126 | 0.2958 | 94.6 |
| 11.4 wt % $\gamma$-$Al_2O_3$ fibre/CeO2—ZrO2—Al2O3 | 0.91 | 0.4520 | 0.4312 | 95.4 |

Comparative Example 2

Quartz Fibre Reinforced Ceria-Zirconia-Alumina Coating

Two samples of quartz wool (2-12 μm diameter, Saint Gobain Quartz) were dispersed in a 30% solids ceria-zirconia-alumina slurry using a high shear stirrer (1.6 and 3.2 wt % $SiO_2$ fibre loading with respect to the slurry solids level). Cleaned 316 stainless steel plates (215 mm×75 mm×1 mm) were coated with the quartz fibre/ceria-zirconia-alumina slurry by K-bar with forced air drying at ambient temperature followed by drying overnight in a 130° C. isothermal oven. Following drying, the coated plate was heated in air to 500° C. at a rate of 2° C./minute. A piece of the coated plate (typically 110×76 mm) was subjected to the $\alpha$-$Al_2O_3$ ball abrasion test described in example 1 and the results are shown in table 2.

TABLE 2

| System | Coating loading (wt %) | Weight of coating present before test (g) | Weight of coating present after test (g) | Coating remaining (wt %) |
|---|---|---|---|---|
| CeO$_2$—ZrO$_2$—Al$_2$O$_3$ only (comparison from example 1) | 0.39 | 0.1907 | 0.1684 | 88.3 |
| 1.6 wt % quartz fibre/CeO$_2$—ZrO$_2$—Al$_2$O$_3$ | 0.40 | 0.1948 | 0.1876 | 96.3 |
| 3.2 wt % quartz fibre/CeO$_2$—ZrO$_2$—Al$_2$O$_3$ | 0.59 | 0.2895 | 0.2867 | 99.0 |

Comparative Example 3

γ-Al$_2$O$_3$ Fibre Addition to TiO$_2$ Coatings

Batches of conventional TiO$_2$-based slurry were prepared either on their own or with various levels of γ-Al$_2$O$_3$ fibres ("Catalyst Grade" fibrous mat supplied by Saffil plc) and/or silica binder with mechanical dispersion. 5.66 inch diameter by 6 inch length metallic catalyst monoliths were coated with this slurry and dried for at 120° C. then fired at 500° C. A drop test was used to determine the effect of fibre addition and/or silica binder addition on the coating integrity (see table 3). Table 3 demonstrates that coating durability is significantly improved by fibre addition to the TiO$_2$-based coating and can be further enhanced by using fibres and a silica binder.

TABLE 3

| System | 4 × Drop % coating loss | 8 × Drop % coating loss |
|---|---|---|
| TiO$_2$ only | 13.4% | 27.5% |
| TiO$_2$ + 10%* milled γ-Al$_2$O$_3$ fibres | 7.3% | 17.4% |
| TiO$_2$ + 20% milled γ-Al$_2$O$_3$ fibres | 6.0% | 10% |
| TiO$_2$ + 20% milled γ-Al$_2$O$_3$ fibres + 20% silica | 0.9% | 1.9% |
| TiO$_2$ + 20% Ludox binder | 3.2% | 6.8% |
| TiO$_2$ + 20% silica + 5% milled γ-Al$_2$O$_3$ fibres | 0.3% | 0.81% |

*with respect to total solids level

Example 1

γ-Al$_2$O$_3$ Fibre Addition to Precious Metal Ceria-Zirconia Coatings

A 41 wt % slurry of a precious metal ceria-zirconia catalyst (Pt pre-fixed to ceria-zirconia composite metal oxide) was prepared with 0, 5, 10 and 15% γ-Al$_2$O$_3$ fibre levels with respect to the solids content of the slurry ("Catalyst Grade" fibrous mat supplied by Saffil plc) with mechanical dispersion to give an estimated fibre length of 80 μm. 70×100 mm metallic strips were spray-coated with this slurry and dried with air drying and calcinations at 500° C. 25 mm scotch tape was used to determine the durability of the coatings with weighing before and after the tape test to quantify coating loss (see table 4). It will be observed from table 4 that addition of the γ-Al$_2$O$_3$ fibres leads to improved levels of coating durability. It will also be observed that fibre addition leads to the deposition of higher loadings of coatings on the uniformly sized metallic strips (20.1, 22.0, 25.2 and 23.9% for 0, 5, 10 and 15% fibre respectively) and consequently thicker coatings. It would be expected that thicker coatings would be weaker than thinner ones and this is a surprising result. Un-milled alumina added to the same wt % of the Saffil fibre did not give any improvement in adhesion. The fibre reinforced coating could also be applied with a hand roller or by precision coating to achieve the same improvement in durability over the non-reinforced coating.

TABLE 4

| System | Coating loading (wt %) | Weight of coating present before tape test (g) | Weight of coating present after tape Test (g) | Coating remaining (wt %) |
|---|---|---|---|---|
| Precious metal CeO$_2$—ZrO$_2$ only | 20.1 | 0.9962 | 0.7527 | 75.6 |
| 5% γ-Al$_2$O$_3$ fibre/ Precious metal CeO$_2$—ZrO$_2$ | 22.0 | 1.1104 | 0.9717 | 87.5 |
| 10% γ-Al$_2$O$_3$ fibre/ Precious metal CeO$_2$—ZrO$_2$ | 25.2 | 1.3237 | 1.2006 | 90.7 |
| 15% γ-Al$_2$O$_3$ fibre/ Precious metal CeO$_2$—ZrO$_2$ | 23.9 | 1.3071 | 1.1532 | 88.2 |

Example 2

γ-Al$_2$O$_3$ and SiC Fibre Addition to Pt/Al$_2$O$_3$ Coatings

Various levels of 80 μm Saffil γ-Al$_2$O$_3$ fibre ("Catalyst Grade" supplied by Saffil plc) passed through a 80 μm screen) were dispersed in a 30% solids slurry of Pt/Al$_2$O$_3$ (Pt prefixed to gamma alumina) and coated onto cleaned stainless steel plates (40×100 mm) using a K-bar. One sample was also prepared using commercially available silicon carbide whiskers. The coated plates were dried and fired at 500° C. and subjected to a 25 mm Scotch tape test.

The adhesion results are shown in Table 5.

TABLE 5

| System | Weight of coating present before test (g) | Weight of coating present after test (g) | Coating remaining (wt %) |
|---|---|---|---|
| Pt/Al$_2$O$_3$ only | 0.1916 | 0.1310 | 68.4 |
| 4.8% γ-Al$_2$O$_3$ fibre-Pt/Al$_2$O$_3$ | 0.2684 | 0.1867 | 69.6 |
| 10.4% γ-Al$_2$O$_3$ fibre-Pt/Al$_2$O$_3$ | 0.2525 | 0.1903 | 75.4 |
| 21% γ-Al$_2$O$_3$ fibre-Pt/Al$_2$O$_3$ | 0.2500 | 0.2310 | 92.4 |
| 30.2% γ-Al$_2$O$_3$ fibre-Pt/Al$_2$O$_3$ | 0.4111 | 0.3388 | 82.4 |
| 50% γ-Al$_2$O$_3$ fibre-Pt/Al$_2$O$_3$ | 0.4087 | 0.3018 | 73.8 |
| 75% γ-Al$_2$O$_3$ fibre-Pt/Al$_2$O$_3$ | 0.2627 | 0.2043 | 77.8 |
| 11.8% SiC whiskers-Pt/Al$_2$O$_3$ | 0.2898 | 0.2810 | 97.0 |

Example 3

Comparison of Abrasion Resistance of Washcoat Compositions of the Invention and Those Prepared Following the Teaching of GB2138694A 2.2 cm diameter and 8.2 cm length 400 cells per square inch honeycomb monoliths were coated with Pt by a variety of methods. Table 6 entries 1-4 correspond to one or more of the embodiments of the present invention while entries 5-8 have been prepared according to the teaching of GB2138694A using platinum-based catalytic metal components instead of heteropolyacids.

Table 6, entry #1 was prepared by dip coating a monolith in a 2Pt/Al$_2$O$_3$ 30% solids slurry, containing 5 wt % Saffil gamma-Al$_2$O$_3$ fibres (with respect to solids), with the catalyst prepared without prefixing the Pt to the Al$_2$O$_3$ support. The coated monolith was dried at 105° C. and fired at 500° C. Table 6, entry #2 was prepared as #1 but the coated monolith was fired at 700° C. Table 6, entry #3 was prepared using a prefixed 2Pt/Al$_2$O$_3$ catalyst made by incipient wetness followed by drying at 105° C. and then calcination at 500° C. A monolith was dip coated in a 30% solids slurry of the catalyst containing 5 wt % Saffil gamma-Al$_2$O$_3$ fibres added with respect to solids. The coated monolith was dried at 105° C. and fired at 500° C. Table 6, entry #4 was prepared as #3 but sample fired at 700° C. Table 6, entry #5 was prepared by dip coating a monolith in a 30 wt % solids mixture of tetraamine platinum (II) hydrogen carbonate in water. No fibres were added. The coated honeycomb was dried at 105° C. and fired at 500° C. Table 6, entry #6 was prepared as #5 but 5 wt % Saffil gamma-Al$_2$O$_3$ fibres added with respect to solids. The coated monolith was dried at 105° C. and fired at 500° C. Table 6, entry #7 was prepared as #6 but the coated monolith was fired at 700° C. Table 6, entry #8 was prepared by spray-coating a monolith using a slurry prepared according to table entry #6. The coated monolith was dried at 105° C. and fired at 500° C.

Samples were tested for coating adhesion/durability by blowing a high pressure air jet (35 psig) down the honeycomb channel structure for 20 seconds to imitate conditions in vehicular exhaust system. Table 6 entries 1-4 show no loss of coating when subjected to the high pressure air abrasion test. However, surprisingly, table entries 5-7 show total loss of coating when subjected to this test.

The catalytic activity of the honeycomb monoliths was assessed using carbon monoxide (CO) absorption, a standard test used to measure catalyst active site density. Method used in table 6 entries 1-4 give high CO absorption measurements indicating efficient use of platinum and the formation of potentially very active catalysts. Conversely, the methods used in table entries 5-8 give very poor CO absorption values (100 times lower than the materials listed in table entries 1-4). This indicated exceptionally bad utilisation of platinum and would predictably lead to poor catalytic performance.

Samples of honeycomb monolith prepared according to table entries 1, 3, 5, 6 and 8 were sectioned axially to demonstrate coating penetration of the honeycomb structure. FIG. 1 showing these samples demonstrates i) that the coatings prepared according to the embodiments of the present invention (entries 1 and 3), show good coating penetration and the light colour indicated good Pt dispersion; ii) that the coatings prepared according to the teaching of GB2138694 (entries 5 & 6) contain poorly dispersed Pt (indicated by the dark colour) and iii) that entry 8, which was prepared using a spray coating method described in GB2138694, shows exceptionally poor coating penetration of the honeycomb structure by this method.

| # | Coating method | Loading achieved (wt %) | Pt loading honeycomb (wt %) | Coating % weight loss on air-gun test | mol CO uptake/g Pt in sample |
|---|---|---|---|---|---|
| 1 | Step 1; 2 PT/Al$_2$O$_3$ 30% solids slurry prepared without prefixing the Pt to the Al$_2$O$_3$ support. Step 2; 5 wt % Saffil γ-Al$_2$O$_3$ fibres added with respect to solids. Dip coating of monolith with drying at 105° C. and firing at 500° C. | 9.4 | 0.19 | 0 | 4.5 |
| 2 | As 1 but sample fired at 700° C. | 10.8 | 0.22 | 0 | 0.2 |
| 3 | Step 1; 2 Pt/Al$_2$O$_3$ catalyst was prepared by incipient wetness followed by drying at 105° C. and then calcinations at 500° C. Step 2; 5 wt % Saffil γ-Al$_2$O$_3$ fibres added with respect to solids. Dip coating of monolith with drying at 105° C. and firing at 500° C. | 8.7 | 0.17 | 0 | 2.8 |
| 4 | As 3 but sample fired at 700° C. | 7.9 | 0.16 | 0 | 1.1 |

-continued

| # | Coating method | Loading achieved (wt %) | Pt loading honeycomb (wt %) | Coating % weight loss on air-gun test | mol CO uptake/g Pt in sample |
|---|---|---|---|---|---|
| 5 | Honeycomb dip coated in a 30 wt % solids mixture of tetraamine platinum (II) hydrogen carbonate in water. No fibres added. Honeycomb dried at 105° C. and fired at 500° C. | 1.9 | 0.98 | N/A | 0.03 |
| 6 | As 5 but 5 wt % Saffil γ-$Al_2O_3$ fibres added with respect to solids. Dip coating of monolith with drying at 105° C. and firing at 500° C. | 7.0 | 3.53 | 100 | 0.02 |
| 7 | As 3 but sample fired at 700° C. | 11.2 | 5.65 | 100 | 0.002 |
| 8 | Slurry prepared for #6 spray coated onto a honeycomb monolith | 0.2 | 0.1 | NR | NR |

The invention claimed is:

1. A solid catalyst carrier substrate coated with a surface area-enhancing washcoat coating, which coating comprising a catalytic component, a metal oxide and a refractory fibrous or whisker-like material having an aspect ratio of length to thickness in excess of 5:1, wherein said substrate is coated with said washcoat coating and said washcoat coating has a thickness of from 5 to 100 μm.

2. A substrate according to claim 1, wherein the aspect ratio of length to thickness is in excess of 50:1.

3. A substrate according to claim 1, wherein the catalytic component comprises at least one metal.

4. A substrate according to claim 3, wherein the at least one metal is selected from the group consisting of a precious metal, magnesium, nickel, cobalt, iron, vanadium, copper, molybdenum, aluminum, silicon and mixtures of any two or more thereof.

5. A substrate according to claim 4, wherein the washcoat coating is formed by applying a washcoat composition to the substrate and drying the washcoat composition, and the metal is present at up to 30 wt % based on the total weight of the washcoat composition.

6. A substrate according to claim 3, wherein the washcoat coating is formed by applying a washcoat composition to the substrate and drying the washcoat composition, and the metal is present at up to 30 wt % based on the total weight of the washcoat composition.

7. A substrate according to claim 1, wherein the washcoat coating is chemically reactive.

8. A substrate according to claim 1, wherein the washcoat coating is porous or gas permeable.

9. A substrate according to claim 1, wherein the substrate is a metallic catalyst substrate.

10. A substrate according to claim 9, wherein the substrate is a flow-through monolith.

11. A substrate according to claim 1, wherein the fibrous or whisker-like material is a gamma alumina fiber.

12. A substrate according to claim 1, wherein the washcoat coating is formed by applying a washcoat composition to the substrate and drying the washcoat composition, and the fibrous material forms 1-15 wt % of the washcoat composition.

13. A substrate according to claim 1, wherein the washcoat coating is formed by applying a washcoat composition to the substrate and drying the washcoat composition, and the metal oxide forms up to 35 wt % of the washcoat composition.

14. A method of forming a substrate according to claim 1, comprising applying to a substrate a slurry comprising a washcoat composition comprising a catalytic component, a metal oxide and a refractory fibrous or whisker-like material having an aspect ratio of length to thickness in excess of 5:1, and drying and firing the coated substrate to form the washcoat coating from the washcoat composition.

15. A slurry comprising a washcoat composition for use in the method of forming a solid catalyst carrier substrate coated with a surface area-enhancing washcoat coating according to claim 1, which washcoat composition comprising a catalytic component, a metal oxide and a refractory fibrous or whisker-like material having an aspect ratio of length to thickness in excess of 5:1.

16. A substrate according to claim 1, wherein the substrate is a static mixer.

17. A substrate according to claim 1, wherein the substrate comprises a wire mesh device.

18. A substrate according to claim 1, wherein the substrate comprises a plate.

19. A substrate according to claim 1, wherein metal oxide is selected from the group consisting of silica, alumina, titania, a ceria-zirconia mixed oxide, and a ceria-zirconia-alumina blend.

* * * * *